(12) United States Patent
Flamang

(10) Patent No.: US 6,945,901 B2
(45) Date of Patent: Sep. 20, 2005

(54) PLANETARY GEAR STAGE

(75) Inventor: Peter Flamang, Edegem (BE)

(73) Assignee: Hansen Transmissions International NV, Edegam (BE)

( * ) Notice: Subject to any disclaimer, the term of this patent is extended or adjusted under 35 U.S.C. 154(b) by 0 days.

(21) Appl. No.: 10/182,677

(22) PCT Filed: Jan. 31, 2001

(86) PCT No.: PCT/IB01/00265

§ 371 (c)(1),
(2), (4) Date: Nov. 13, 2002

(87) PCT Pub. No.: WO01/57415

PCT Pub. Date: Aug. 9, 2001

(65) Prior Publication Data

US 2003/0125158 A1 Jul. 3, 2003

(30) Foreign Application Priority Data

Jan. 31, 2000 (GB) .............................................. 0002126

(51) Int. Cl.$^7$ .......................... F16H 57/08; F16C 33/58
(52) U.S. Cl. ....................................... 475/331; 384/513
(58) Field of Search ................................ 475/331, 334; 384/513, 535

(56) References Cited

U.S. PATENT DOCUMENTS

| 1,978,707 A | 10/1934 | Gibbons |
| 2,983,029 A | 5/1961 | Perin et al. |
| 3,513,480 A * | 5/1970 | Robinson ..................... 384/535 |
| 4,799,396 A * | 1/1989 | Ito .............................. 475/331 |
| 6,053,638 A * | 4/2000 | Muraki et al. ............... 384/513 |
| 6,530,859 B2 * | 3/2003 | Boston et al. .............. 475/331 |

FOREIGN PATENT DOCUMENTS

| EP | 000811764 A1 * | 12/1997 |
| EP | 001045140 A2 * | 10/2000 |
| WO | WO 96 11338 A | 4/1996 |

* cited by examiner

*Primary Examiner*—Roger Pang
(74) *Attorney, Agent, or Firm*—Young & Thompson

(57) ABSTRACT

A gear unit comprises a planetary stage having at least one bearing which locates a planet carrier rotatably relative to a ring gear, wherein a bearing ring A is subject to local deformation as the planet carrier rotates relative to the ring gear, and wherein a bearing ring B, which is rotatable synchronously with the planet carrier, is precompensated whereby, in comparison with a non-precompensated bearing ring B, radial squeezing of the rolling members of bearing or load concentrations or local unloading of the rolling members of the bearing is reduced.

10 Claims, 5 Drawing Sheets

(Cross sectional view of Fig. 3b)

(Cross sectional view of Fig. 3b)

PLANETARY GEAR STAGE

BACKGROUND OF THE INVENTION

The need for weight reduction in mechanical drives has in the past lead to an increased use of planetary gear units.

In a number of applications, more and more integration and lightweight designs are being introduced. This leads to a higher importance of deflections and local deformations. This applies particularly in the case of a gear unit for use in a wind turbine and for which application it has been proposed optionally to utilise a ring gear to act as a support directly for an inner or outer bearing ring.

This invention addresses the consequence on bearing performance of local deformation of the ring gear of a planetary gear stage by the passage of the planets in the relative motion of the gear system.

As shown diagrammatically in FIG. 1, the resultant gear force (Fn) acting at the gear contact between a planet gear 10 and ring gear 11 includes a radial (Fr) and a tangential (Ft) component. Also axial forces may occur for instance when helical gears 10 are used.

Although the present invention seeks to consider all components of the occurring forces, it is to be understood that for instance the radial force can lead to significant local elastic deformations of the ring gear. When the gear unit is in operation this deformation will run through the ring gear at a speed which is synchronous with the moving planets i.e. with the planet carrier 12.

The magnitude of this deformation will depend on the forces and the surrounding structural stiffnesses.

In typical state-of-the-art planetary gear units, the planet carrier 20 (see FIG. 2) is mounted in bearings 21 which center in the ring gear 22 via an intermediate flange or housing 23.

This means that any local deformations of the ring gear due to the passage of the planets will be distributed more evenly by this intermediate flange or housing. Thus when load is applied to the bearings, for instance external forces from the rotors of a wind turbine, they will be operating with loads that are relatively well distributed over the different rollers of the bearings.

FIGS. 3a to d show examples of a more integrated and lightweight design, where the application, such as a wind turbine rotor, can be directly, or via a flange, connected to the planet carrier (FIG. 3a, 3b, 3c) or to the ring gear (FIG. 3d). Also external forces which may come from the connected application will have to be supported by the construction.

Because of the integration, the structural stiffnesses of the system change and forces acting in the gear contact between planets and ring gear can now lead to significant local deflections of the bearing(s)

in FIGS. 3a, 3c and 3d, the outer ring 30 of the bearing(s) will deform locally at the passage of the planets 31.

in FIG. 3b, a variant of FIG. 3a, the inner ring 32 of the bearing will deform locally at the passage of the planets 34.

As can be seen from the examples in FIG. 3, it is always the bearing ring connected to or integrated with the ring gear 35 which suffers from the above type of local deformation. By definition herein, we call this bearing ring A, whereas the other bearing ring which rotates synchronously (including standing still) with the planet carrier is called bearing ring B.

SUMMARY OF THE INVENTION

The present invention seeks to provide a gear unit comprising a planetary stage in which the aforedescribed difficulties are mitigated or overcome.

In accordance with one aspect of the present invention a gear unit includes a planetary stage having at least one bearing which locates a planet carrier rotatably relative to a ring gear, wherein a bearing ring A of the bearing is subject to local deformation as the planet carrier rotates relative to the ring gear, and wherein the bearing has a bearing ring B, which is rotatable synchronously with the planet carrier, is precompensated whereby, in comparison with a non-precompensated bearing ring B, radial squeezing of the rolling members of bearing or load concentration or local unloading of the rolling members of the bearing is reduced.

DESCRIPTION OF THE PREFERRED EMBODIMENTS

Figure 1:
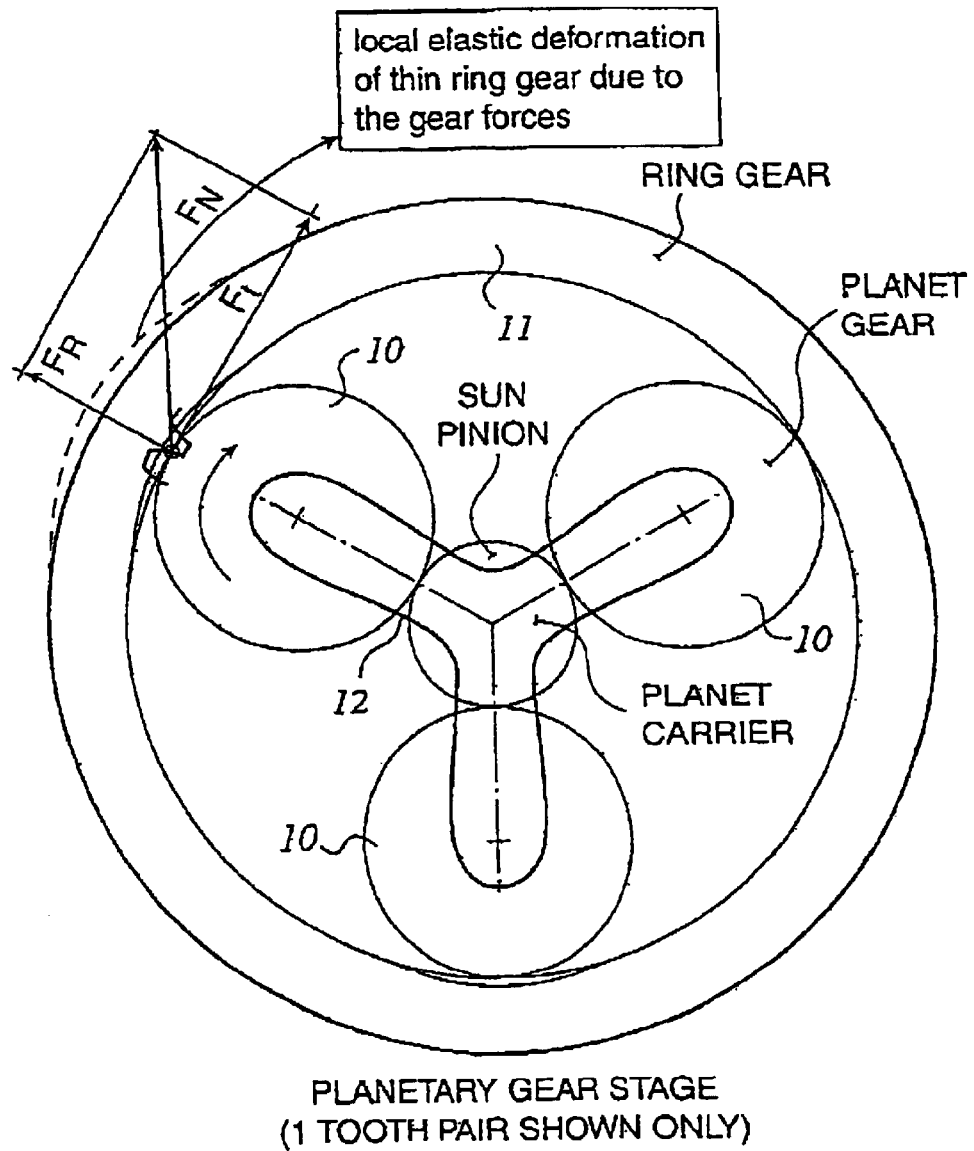
FIG. 1 is a schematic diagram of a planetary gear unit of the prior art.
Figure 2A:
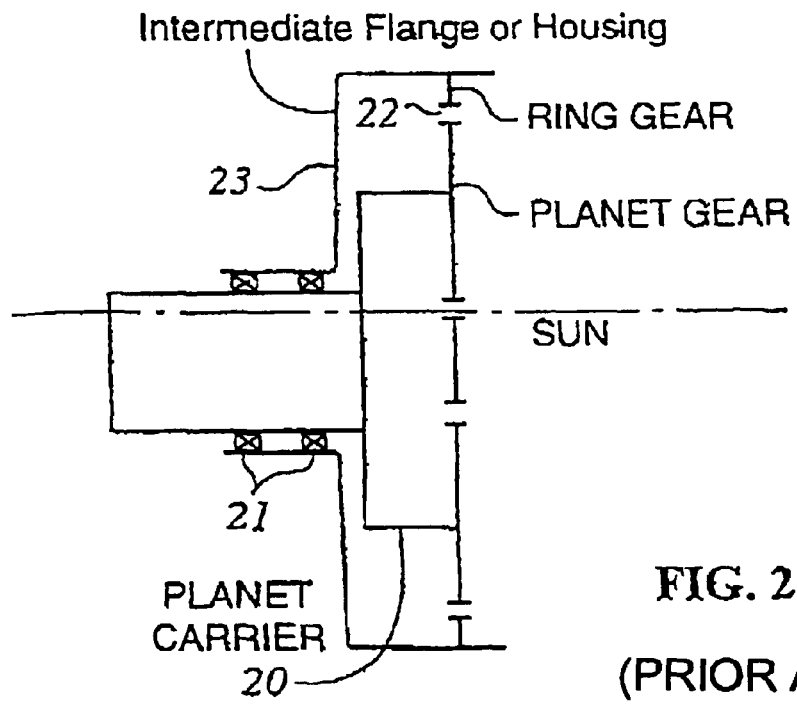
FIGS. 2a–b are schematic representations of side views of planetary gear units of the prior art.
Figure 2B:
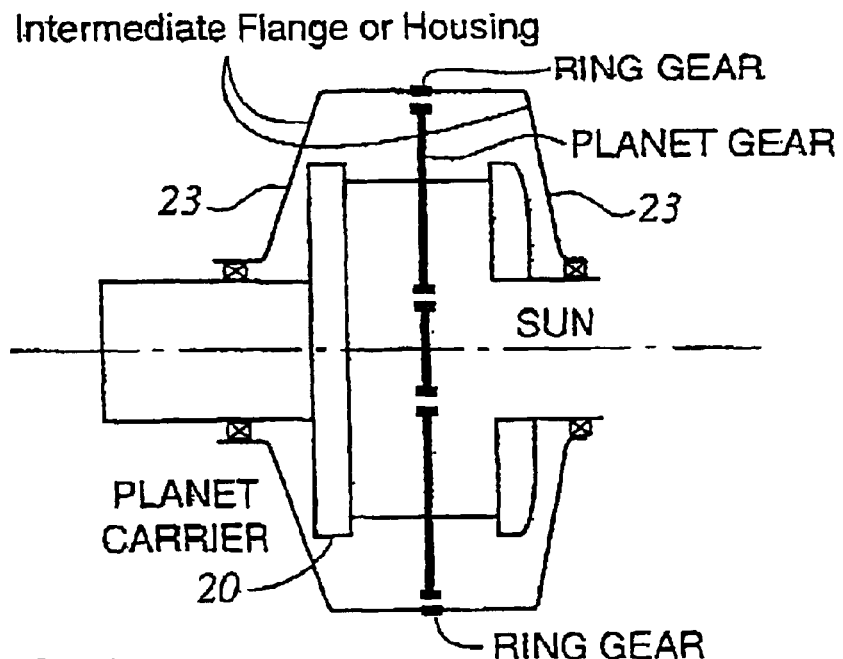
Figure 3A:
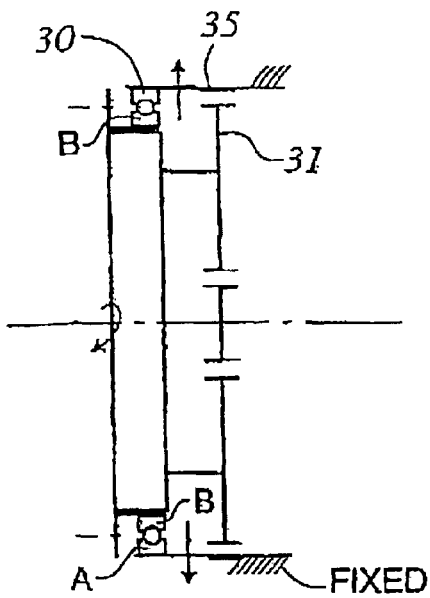
FIGS. 3a–d are schematic representations of planetary gear unit arrangements in which the present invention finds application.

The present invention thus provides a bearing ring B construction which compensates for the local changes in geometry of bearing ring A. As bearing ring B rotates (or stands (as in FIG. 3d) synchronously with the planet carrier, the deformation waves caused by the planets will rotate synchronously with the precompensated bearing ring B construction. Therefore the precompensation works in all rotational positions of the gear system.

Figure 3B:
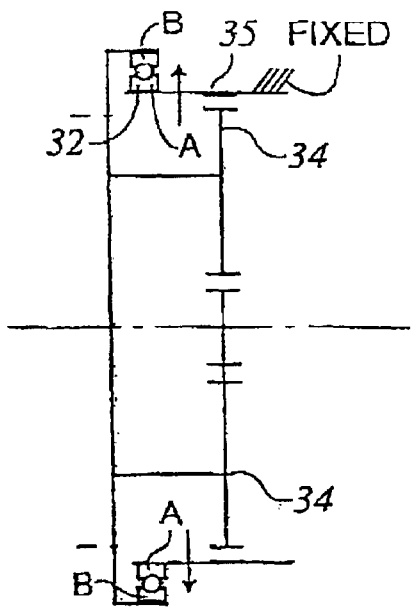
Figure 4:
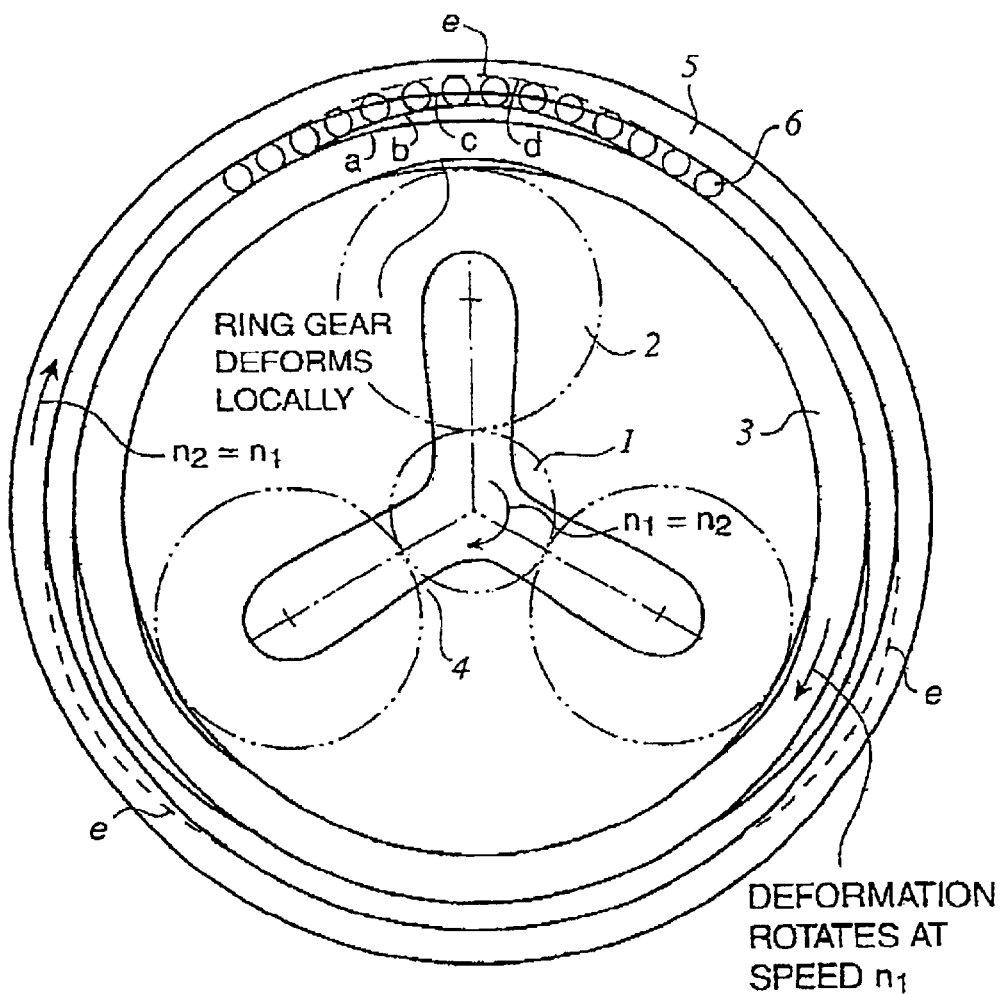
FIG. 4 is a schematic diagram of an embodiment of the present invention.

Reference is now made to the cross-sectional view in FIG. 4 (which is a cross-sectional view of FIG. 3b) to describe, by way of example only, one embodiment of the invention.

In FIG. 4, the following element designations are used: 1.—Sun pinion gear, 2.—Planet gear, 3.—Ring gear, 4.—Planet carrier, 5.—Outer bearing ring (Rotates synchronously with planet carrier—see FIG. 3b), 6.—Bearing rolling system, a.—Non-deformed outer contour of ring gear, b.—Deformed outer contour of ring gear, c.—Inner contour of outer bearing ring without precompensated construction, d.—Inner contour of outer bearing ring with precompensated construction, e.—Offset zone of inner contour of outer bearing ring, $n_1$—Rotational speed of planet carrier, and $n_2$—Rotational speed of outer ring of bearing.

This embodiment is described in relation to the aforementioned construction of FIG. 3b. If the precompensating construction is not employed, the rolling elements 6 of the bearing would be squeezed between the deformed outer contour (b) of the ring gear 3 and contour (c) of the bearing outer ring 5. The construction with precompensation results in a contour (d) of the bearing outer ring 5, thus avoiding undesirable squeezing of the rolling elements 6 and resulting in a better distribution of loads applied to the bearing.

This leads to advantages such as lower weight of the ring gear 5 because of reduced required stiffness and selection of smaller or lower cost type bearing(s). Also the overall structural stiffness can be controlled better, which results in the potential for improved dynamic behavior of the total application system.

Figure 3C:
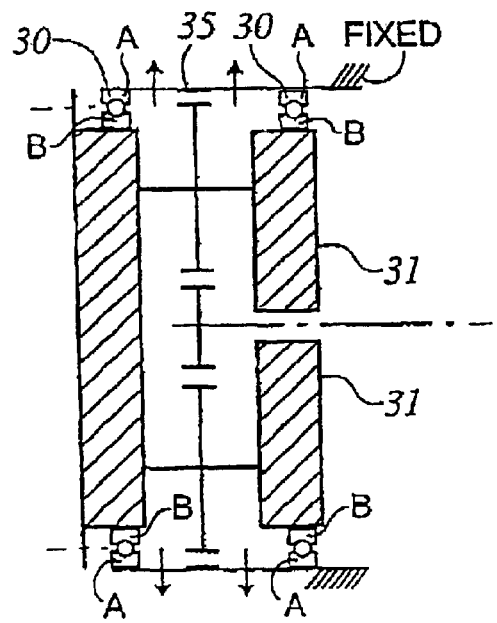
Figure 3D:
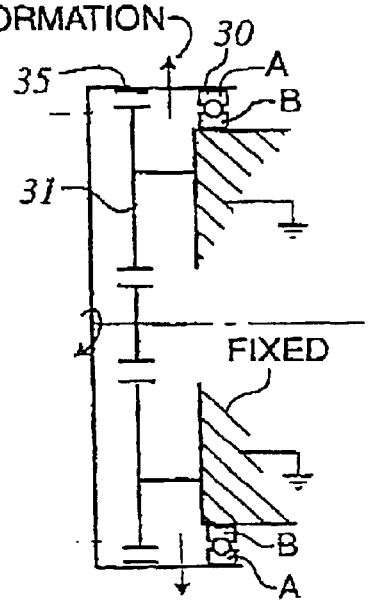

The invention envisages accordingly a planetary gear stage with at least one bearing locating the planet carrier relative to the ring gear and where bearing ring A, which can be the inner or the outer ring of the bearing(s), is deformed locally due to the effect of planet passage in the ring gear, whereby the bearing ring B, rotating synchronously with the planet carrier (including standing still), is precompensated such that squeezing of the rolling elements or load concentrations or local unloading (as would be the case in FIGS. 3a, 3c and 3d) caused by the local deformation of bearing ring A is avoided.

Options for achieving precompensations include:- precompensation by adapting the race geometry of bearing ring B.

precompensation by adapting the outer surface geometry of bearing ring B.

precompensation by adapting the supporting geometry for instance by a centering spigot of bearing ring B.

precompensation by adapting the supporting structure of bearing ring B by providing the supporting structure with a stiffness that enables the supporting structure to compensate elastically for the planet movements.

precompensation by adapting the supporting structure on or in which bearing ring B is located with preload.

The adaptation to achieve precompensation is preferably effected by selective dimensioning, for example to make component dimensions larger or smaller than normal. The selective dimensioning may achieve precompensation by resulting in either elastic or geometric compensation.

Bearing ring B may include a non-cylindrical surface for contact by bearing rolling elements. The bearing surface may include a number of surface zones of cylindrical shape alternating with a number of circumferentially spaced zones which lie offset radially from the cylindrical surface, a number of the zones being equal to the number of planet gear positions.

Figure 5:
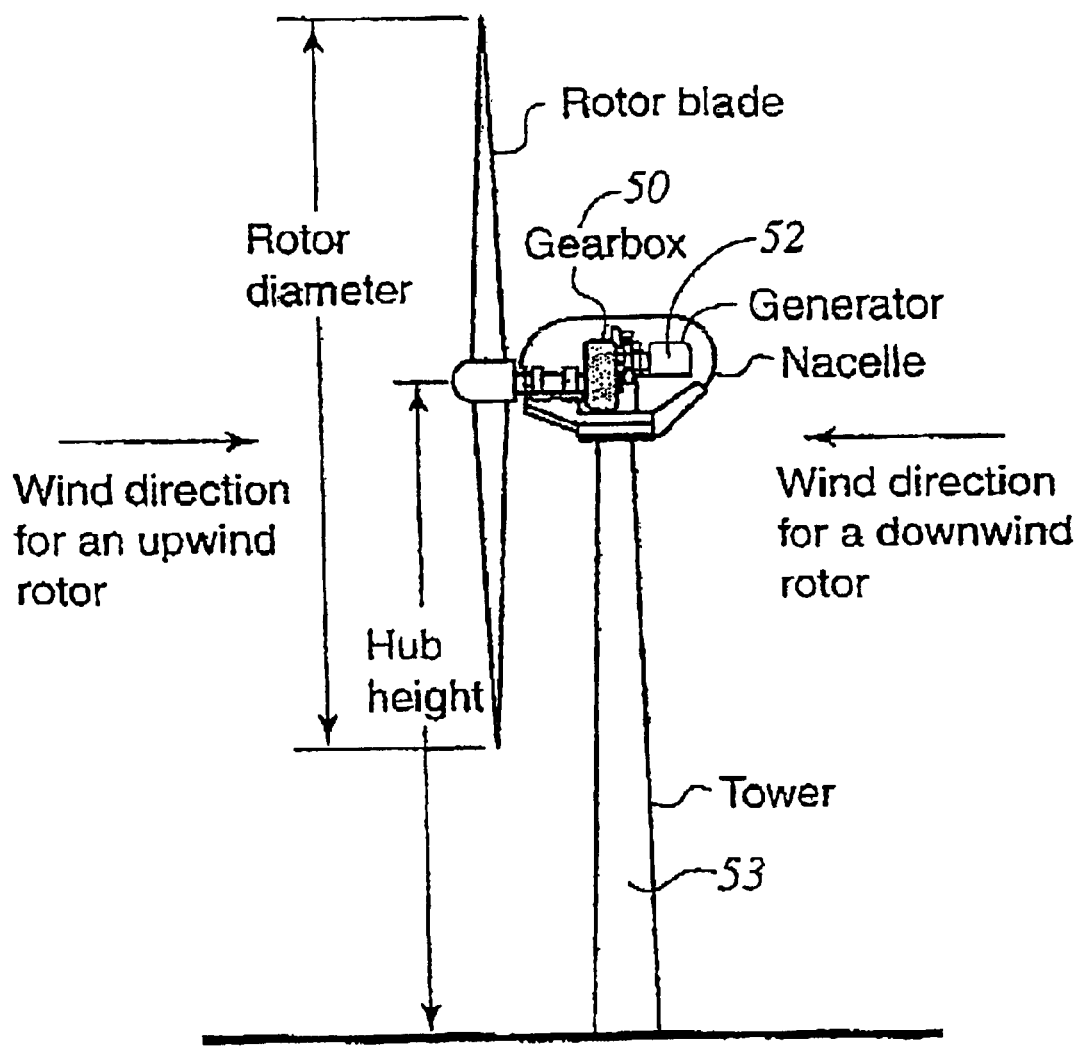
FIG. 5 is a side view of a wind turbine in which the present invention finds application.

A gear unit 50 of the present invention is particularly suitable for use in a wind turbine (see FIG. 5) to transmit torque between the rotors 51 and an electrical generator 52 mounted at the top of a tower 53.

What is claimed is:

1. A gear unit comprising:
a planetary stage having at least one bearing construction which locates a planet carrier rotatably relative to a ring gear,
wherein a bearing ring A of said bearing construction is subject to local deformation as the planet carrier rotates relative to the ring gear, and
wherein said bearing construction comprises a bearing ring B, which is rotatable synchronously with the planet carrier and that is precompensated for the local deformation of bearing ring A only in local regions that are spaced apart over a circumference of the bearing ring B, whereby, in comparison with a non-precompensated bearing ring, radial squeezing of rolling members of the bearing or load concentrations or local unloading of the rolling members of the bearing is reduced.

2. A gear unit according to claim 1 wherein precompensation is achieved by adaptation of race geometry of said bearing ring B.

3. A gear unit according to claim 1 wherein precompensation is achieved by adaptation of an outer surface geometry of said bearing ring B.

4. A gear unit according to claim 2 wherein said bearing ring B comprises a non-cylindrical surface for contact by the rolling members.

5. A gear unit according to claim 4 wherein said bearing surface comprises a number of surface zones of cylindrical shape alternating with a number of circumferentially spaced zones which lie offset radially from said cylindrical surface, a number of said zones being equal to the number of planet gear positions.

6. A gear unit according to claim 1 wherein precompensation is achieved by adaptation of a supporting structure.

7. A gear unit according to claim 1 wherein precompensation is achieved by providing a supporting structure with a stiffness in consequence of which said supporting structure compensates elastically for deformation of the bearing ring A during movement of the planet gears.

8. A gear unit according to claim 1 wherein precompensation is achieved at least in part by selective pre-load of a supporting structure on or in which the bearing ring B is located.

9. A gear unit according to claim 1, further comprising a wind turbine that incorporates the gear unit.

10. A gear unit, comprising:
a planetary gear stage that locates a planet carrier rotatably relative to a ring gear; and
a bearing associated with the ring gear and that comprises a first bearing ring that locally deforms as the planet carrier rotates relative to the ring gear, a second bearing ring that rotates synchronously with the planet carrier, and rolling members between the first and second bearing rings,
said second bearing ring being radially precompensated for the local deformation of the first bearing ring only in local regions that are spaced apart over a circumference of the second bearing ring so that radial squeezing of the rolling members is reduced in comparison with a non-precompensated bearing ring.

* * * * *

UNITED STATES PATENT AND TRADEMARK OFFICE
CERTIFICATE OF CORRECTION

PATENT NO. : 6,945,901 B2
DATED : September 20, 2005
INVENTOR(S) : Peter Flamang It is certified that error appears in the above-identified patent and that said Letters Patent is hereby corrected as shown below:

Title page,
Item [73], Assignee, correct from "Edegam" to -- Edegem --.

Signed and Sealed this

Sixth Day of December, 2005

JON W. DUDAS
*Director of the United States Patent and Trademark Office*